United States Patent [19]

Jans

[11] Patent Number: 4,785,298

[45] Date of Patent: Nov. 15, 1988

[54] CIRCUIT ARRANGEMENT FOR TELECOMMUNICATIONS SYSTEMS, PARTICULARLY TELEPHONE SWITCHING SYSTEMS, COMPRISING AN INFORMATION INTERROGATING DEVICE WHICH CYCLICALLY DRIVES INQUIRY LOCATIONS

[75] Inventor: Herbert Jans, Neuried, Fed. Rep. of Germany

[73] Assignee: Siemens Aktiengesellschaft, Berlin and Munich, Fed. Rep. of Germany

[21] Appl. No.: 890,114

[22] Filed: Jul. 28, 1986

[30] Foreign Application Priority Data

Aug. 14, 1985 [DE] Fed. Rep. of Germany ....... 3529165

[51] Int. Cl.⁴ .......................... H04Q 9/16; H04Q 3/24
[52] U.S. Cl. ....................... 340/825.100; 340/825.130; 379/384
[58] Field of Search .......... 340/825.1, 825.12, 825.13; 379/92, 384, 113; 455/166

[56] References Cited

U.S. PATENT DOCUMENTS 3,868,482  2/1975  Colas ................................ 379/384
4,071,908  1/1978  Brophy et al. ................... 379/92
4,683,531  7/1987  Kelch et al. .................... 340/825.08

FOREIGN PATENT DOCUMENTS 2748795  5/1979  Fed. Rep. of Germany .
0032848  4/1981  Japan ............................. 340/825.13
0005454  1/1982  Japan ............................. 340/825.1

OTHER PUBLICATIONS

DE3443616A1, 05/1986, W. Zilbauer.

Primary Examiner—Donald J. Yusko
Attorney, Agent, or Firm—Hill, Van Santen, Steadman & Simpson

[57] ABSTRACT

An interrogating device cyclically calling in an information from various inquiry locations controls the various inquiry locations differing in frequency to which end addresses of the inquiry locations are stored a different number of times in an interrogation control memory. When an interrogating device has not received any information upon interrogation of an inquiry location, then this inquiry location is skipped the next time. For this purpose, a note bit is stored in the interrogation control memory at the address which was just interrogated. When the same memory location in the interrogation memory is reached again after an interrogation cycle, the note bit effects that the address is not read and that the inquiry location is instead skipped once; the note bit is thereby erased in turn.

1 Claim, 1 Drawing Sheet

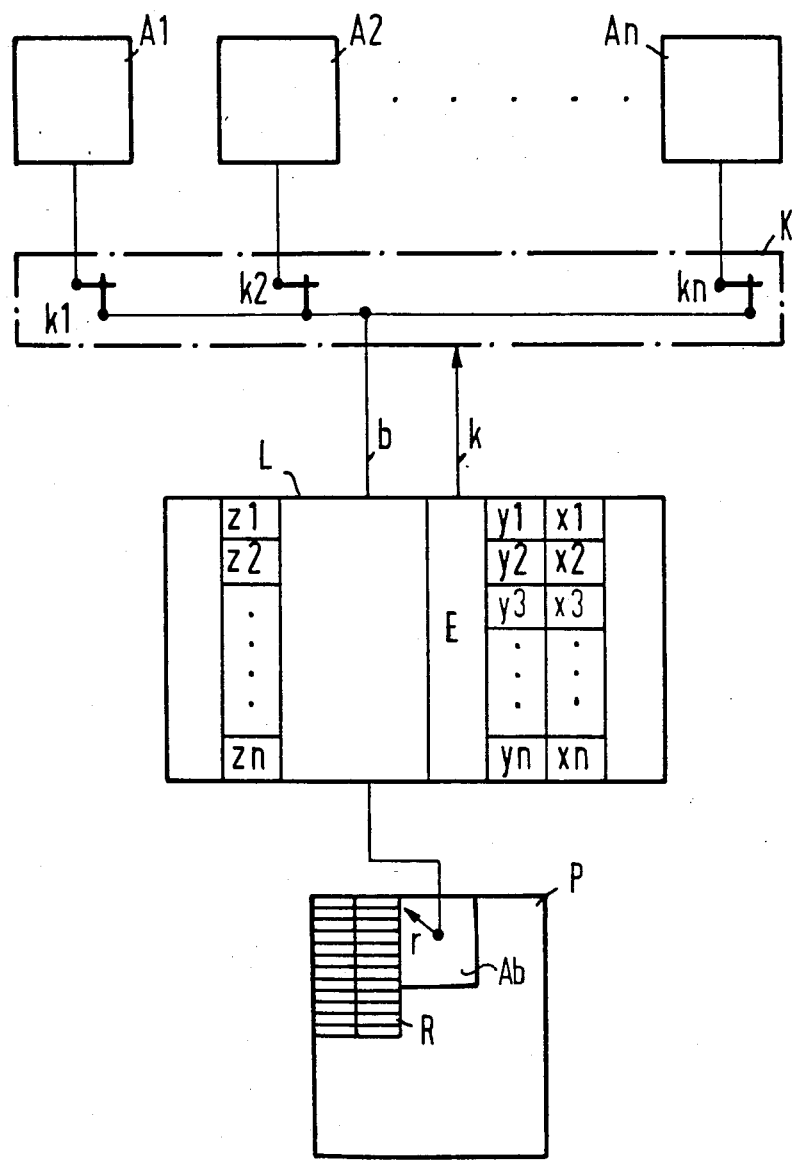

CIRCUIT ARRANGEMENT FOR TELECOMMUNICATIONS SYSTEMS, PARTICULARLY TELEPHONE SWITCHING SYSTEMS, COMPRISING AN INFORMATION INTERROGATING DEVICE WHICH CYCLICALLY DRIVES INQUIRY LOCATIONS

CROSS REFERENCE TO RELATED APPLICATIONS

This application is related to an application Ser. No. 896,253, filed Aug. 13, 1986 and to an application Ser. No. 894,763 filed Aug. 8, 1986.

BACKGROUND OF THE INVENTION

1. Field of the Invention

The present invention relates to a circuit arrangement for telecommunications systems, particularly telephone switching systems, comprising an information interrogating device which cyclically drives a plurality of inquiry locations, these information interrogating devices driving the inquiry locations to solicit information which may be present under given conditions with different interrogation frequencies with respect to the various inquiry locations and respectively modifying the interrogation frequency with respect to an inquiry location dependent on the appearance of an information to be solicited. It further comprises interrogation memories assigned to the information interrogating devices in which the individual number of drive events within a respective overall drive cycle covering all inquiry locations is individually stored for each of the inquiry locations, whereby the individual plurality of drive events is stored in the interrogation memory for each of the inquiry locations by way of a corresponding one-time (or repeated) storing of their respective addresses at a corresponding number of memory locations which are distributed within the cyclical sequence of the totality of memory locations, regularly distributed and successively read following one another.

2. Description of the Prior Art

A circuit arrangement of the type set forth above is disclosed in the German published application No. 3,443,616, and enables inquiry locations to be interrogated with a different frequency. Inquiry locations can be individual scan points, for example, in subscriber-associated switching devices, such as connector sets or subscriber line circuits. This is set forth in terms of further details in, for example, the German published application No. 2,748,795. Incoming switch identifiers are recognized in that the interrogation events undertaken at a scan point proceeding from a certain time acquire different interrogation results than previously, in particular, for the duration of the switch identifier. In this context, the German published application No. 2,748,795 discloses that, for example, selection pulses output by subscriber stations arrive in connector sets. The scan points are normally sensed in a relatively slow tempo. When the beginning of a selection pulse is recognized by way of an interrogation event, then the relatively slow interrogation tempo is replaced by a relatively fast interrogation tempo. In an arrangement as set forth in the German published application No. 2,748,795, the possibility is therefore created of acquiring the end of a respective selection pulse and, therefore, the duration of the appertaining selection pulse as accurately as possible in chronological terms. In this manner, for example, selection pulses and switch identifiers formed by pulses having a different duration can be distinguished from one another with great reliability.

When, in this last-mentioned case, an interrogation result indicating a pulse beginning is identified, then the interrogation tempo therefore changes from a relatively slow sequence to a relatively fast sequence. When, in a second interrogation event (or in the third interrogation event) a further interrogation result of the same content is identified after an interrogation result indicating a pulse beginning, then it is seen therefrom that this, in fact, did not involve a pulse beginning, but a disturbance. For the further interrogation events, the interrogation tempo in response thereto is, in turn, changed from the relatively fast sequence to the slow sequence.

In the case known from the last-mentioned German published application, the change of the interrogation tempo serves the purpose of increasing the interrogation capacity of an interrogating device by slowing the interrogating tempo in that the number of inquiry locations can thereby likewise be increased to a corresponding degree, whereby a relatively chronologically accurate acquisition of switch identifiers having a defined and individual duration is nonetheless guaranteed. When, however, it is not a matter of a cyclical scanning of scan points for the acquisition of switch identifiers by distinguishing the switch identifier from the alternate switching state (for example, pulse pause and "interselection time") but is a matter of a soliciting complete information from individual inquiry locations, then a different problem comes to fore. The occurrence of information to be solicited can be extremely different at different inquiry locations. If the various inquiry locations are cyclically uniformly driven, then there can be inquiry locations at which the information to be solicited back up, whereas there are other inquiry locations at which the information solicited are only sporadically present when they are driven and interrogated. In comparison to the principle of cyclical scanning, the principle of driving inquiry locations on the basis of individual output request present signals is also known in this context. However, the outlay which must be expended for generating, outputting, transmitting, accepting and evaluating these request present signals is disadvantageous, as is the successive processing of these request present signals.

The invention therefore proceeds from a circuit arrangement of the type set forth above wherein the various inquiry locations are cyclically driven.

In circuit arrangements of the type specified, it can then occur that the occurrence of information to be solicited at the various inquiry locations is not only unequal, but is also subject to fluctuations per inquiry location, and that a discontinuous change in the multitude of information to be solicited can occur at individual inquiry locations. In order to counter this problem, the German published application No. 3,443,616 proposes a circuit arrangement in which it is provided that an information interrogating device, sequencing in successive interrogation cycles, assigns and stores cycle numbers for the inquiry locations for the assignment of interrogation frequencies for these inquiry locations, the cycle numbers respectively indicating the number of interrogation cycles at which the appertaining inquiry location is driven respectively once. An inquiry location, accordingly, is interrogated only once in an interrogation cycle or in two or more interrogation cycles, depending on the measure of the respectively stored cycle number. It is also proposed in accordance with this circuit arrangement that every receipt of an information from an inquiry location, the information interrogating device immediately drives this inquiry location again at the next interrogation cycle and either repeats this given another receipt of an information or, in the opposite case, continues the interrogation tempo from this point based on the measure of the cycle number stored for this inquiry location. Accordingly, therefore, the interrogation tempo per inquiry location is increased from an interrogation tempo individually assigned to the appertaining inquiry location to a uniform, maximum interrogation tempo. In addition, it is provided in accordance with the proposed circuit arrangement that the information accepted from the various inquiry locations are counted in time intervals per inquiry location and the cycle numbers are again adapted inversely proportional after each time interval based on the measure of these counter results, for example, by the respective value "1". Accordingly, the cycle numbers stored per inquiry location are dynamically adapted dependent on the actual traffic volume.

Given a circuit arrangement of this type, therefore, a heavier crush of information to be interrogated at an inquiry location therefore effects that this is interrogated in every interrogation cycle instead of being interrogated based on the measure of the respectively stored cycle number. This means that this inquiry locations having a higher volume of information to be interrogated at the time are interrogated with equal frequency. A greater crush of information to be interrogated at all inquiry locations would result in all inquiry locations being interrogated with equal frequency. As a result thereof, the effect of having the different inquiry locations interrogated with different frequencies which is produced by the cycle numbers stored per inquiry location would be completely canceled precisely in those times of particularly high volume of information to be interrogated.

SUMMARY OF THE INVENTION

The object of the present invention is to provide a circuit arrangement of the type set forth above which, given unequal occurrence of information to be solicited at the various inquiry locations as well as given fluctuations in this regard and given discontinuous change of the volume of information to be solicited at individual inquiry locations, the different interrogation frequency provided for these is no simply canceled, whereby, however, the information interrogating device should react to the volume of information to be interrogated in order to oppose the formation of a back up with respect to the information to be interrogated at the inquiry locations. In this context, furthermore, another object of the invention is to reduce both the circuit-oriented expense and the control-oriented work expense for considering the fluctuating and partly discontinuously changing volume of information to be interrogated in comparison to the prior circuit arrangement. The invention should thereby particularly do justice to the fact that the number of information to be individually successively interrogated which are present for inquiry location is unresolved, i.e. that a respective plurality of information can also be simultaneously present ready for interrogation per inquiry location and that, given special consideration thereof, those devices and operations by way of which the interrogation events are adapted to the fluctuating partly discontinuously changing volume of information to be interrogated should be fashioned in a particularly simple manner.

The invention achieves the above object in that, in addition, to each of the address storage and in assignment thereto, a note bit formed given non-appearance of information respectively anticipated from an inquiry location after driving of the inquiry location by way of the respective address, is storable. When such a memory location at which the note bit is stored is reached again in the course of the successive reading of the memory locations, the address stored thereat is not read, whereby the selection or drive of the appertaining inquiry location is suppressed once. The note bit is thereby erased in turn.

In accordance with the invention, therefore, the interrogation frequency for an inquiry location is reduced to about half as soon as and as long as no information is received from the inquiry location. Accordingly, therefore, an inquiry location whose address multiply occurs, for example three times in the interrogation cycle and which did not supply any information the first time during an interrogation event, is not yet skipped during the next interrogation event because of this, but is not skipped until a somewhat later interrogation, for example during the following interrogation event. A certain inertia of the control herein, however, only has an extremely light effect because no particular crush of information can be present at an inquiry location at which the information expected for interrogation remains out. The skipping of an inquiry location with respect to the interrogation events which controls the frequency of the interrogation events for the particular inquiry location still comes to bear early enough, even though slightly later, that a sudden increase of the number of information to be interrogated at the appertaining location (on which, therefore, the skipping could have a negative influence) cannot yet have occurred in this regard. On the contrary, the skipping which takes effect somewhat delayed has a relieving effect for the information interrogating device and allows the interrogation frequency to be adapted to the respective quantity of information present and to be interrogated per inquiry location.

BRIEF DESCRIPTION OF THE DRAWING

Other objects, features and advantages of the invention, its organization, construction and operation will be best understood from the following detailed description, taken in conjunction with the accompanying drawing, on which there is a single FIGURE showing a schematic circuit representation of apparatus constructed in accordance with the present invention.

DESCRIPTION OF THE PREFERRED EMBODIMENTS

The drawing illustrates an exemplary embodiment of the invention only in terms of its component parts significantly contributing to an understanding of the invention.

The exemplary embodiment illustrated on the drawing shows portions of a circuit arrangement of telephone switching technology which is assumed to be known in terms of its numerous possibilities of construction. In the present case, it is assumed that this is a matter of a centrally-controlled telephone switching system in which all of the control events, for example, connection set-up events, are centrally and/or subcentrally controlled. It is assumed that a central or subcentral information-processing sequential logic system P serves for the execution of these events. Naturally, it has limited call-handling capability in view of the information processing capacity.

Connection-associated switching devices are present in a great number in telephone switching systems. These connection-associated switching devices can be a matter of subscriber line circuits, selection receiving sets, connector sets, line terminators of local and long-distance lines and the like. In case the telephone switching system is constructed in pulse code modulation (PCM) technology, the connection-associated devices are a matter of ports in the connecting groups. Detailed relationships regarding this are described in great detail in the description of the digital switching system EWSD in the supplement to the periodical "Telcom Report", 1981.

Information which are to be processed arrive into the connection-associated switching devices. This is thereby a matter of all switch identifiers which are output from subscriber stations from which subscribers intend to establish connections. The analogous case applies to connection-associated switch devices which are not subscriber associated, for example, connector sets, line terminators and the like.

All information arriving into the connection-associated switching devices are to be processed at a central or subcentral location. These information are continuously interrogated in a known manner with the assistance of scan events, i.e. are solicited from the connection-associated switching devices by information interrogating devices.

Inquiry locations A1, A2 ... An are indicated in the upper portion of the drawing. A switching matrix K, an information interrogating device L to which the switching matrix likewise belongs and a central processor P are shown on the drawing. In this context, the German published application No. 3,128,365 is referenced as disclosing a circuit arrangement of this type. In this known case, the inquiry location would be buffers; the information interrogating device would be an input-/output device. The known arrangement can be fashioned according to the present invention. A corresponding digital switching system is also described in the aforementioned periodical "Telcom Report".

The information interrogating device L shown on the drawing controls the multitude of inquiry locations A1-An regularly with the assistance of the switching matrix K assigned thereto, this comprising matrix switching devices k1-kn per inquiry location. The control of the switching matrix K by the information interrogating device L occurs over a path k in a known manner and is therefore not set forth in detail here. The selection can likewise occur in a known manner with the assistance of addresses which are transmitted to the inquiry locations via an address multiple corresponding connection device in the inquiry locations then connecting the respective inquiry location to a common data bus. In this case, the matrix switching devices k1-kn are accommodated in the inquiry locations A1-An. It is likewise possible to accomplish this selection of the inquiry locations by the information interrogating device L via a common data bus in time-division multiplex in a known manner.

The information interrogating device L therefore regularly drives the inquiry locations A1-An in succession for soliciting information which may be present at the inquiry locations. This selection occurs with different interrogating frequencies with respect to the various inquiry locations. This is accomplished in that some of the inquiry locations are each selected only once, other inquiry locations are selected twice, others are selected three times, etc in each interrogation cycle, whereby, therefore, the interrogation with respect to the various inquiry locations occurs with different frequency. As shall be set forth in detail below, the information interrogating device L is also capable of modifying the interrogation frequency with respect to each of the inquiry locations dependent on the appearance of information to be solicited. Consequently, the appertaining interrogation cycle is chronologically shortened overall to that degree to which inquiry locations are respectively not selected in an interrogation cycle. The information interrogating device L accomplishes the selection events via the control path k. This is executed with the assistance of a selection device E of the information interrogating device L. The device E contains an interrogation memory comprising memory locations y1-yn. A respective address serving for the drive of respectively one of the inquiry locations A1-An is stored at each memory location. The appertaining address of each of these switching devices (inquiry locations) is stored at least once, namely, only once for some, twice for some, i.e. once each at two different memory locations, three times for some, i.e. at three different memory locations in a corresponding manner, etc, up to a maximum of, eight times at eight different memory locations.

The selection device E controls the inquiry locations in that it searches the memory locations y1-yn successively and in cyclical succession, whereby (y-yn) is a matter of an overall selection cycle in the sense initially set forth, and reads the addresses of the various interrogating device stored therein in individual succession, and transferring the addresses to the switching matrix K in succession. Here, the effect of the connection of the respective inquiry locations to a processor P in individual succession, the processor P interrogating the inquiry location respectively selected as to the existence of a solicitible information with the assistance of a call-in device Ab. When the call-in device Ab receives an information via a data path b and via the information interrogating device L, potentially given brief duration intermediate storage in a memory having cells z1-zn provided per selection device, then the call-in device stores this information with the assistance of write device r in a list memory R of the processor P which, in turn, gradually calls the information from the list memory R for processing.

The various inquiry locations are therefore interrogated with different interrogation frequencies, the plurality of storages of the addresses of the inquiry locations serving this purpose. When an address of an inquiry location is repeatedly stored in the interrogation memory in this manner, then these storages are uniformly distributed in the row of memory locations y1-yn such that the appertaining inquiry location is successively driven in approximately identical time intervals. The individual number of drive events per inquiry location is therefore stored in the interrogation memory composed of the memory locations y1-yn on the basis of the plurality of storages of their respective addresses, namely, by the plurality of address storages per inquiry location.

The frequency with which the inquiry locations are interrogated which is equivalent to the interrogation frequency is not defined only by the described plurality of storages of addresses per inquiry locations, but is also modified on a case-by-case basis by the information interrogating device L dependent on the appearance of an information to be solicited. Whenever an inquiry location has not supplied any information when interrogated by selection via its address, i.e. each time information expected from this inquiry location after a selection of the location with the respective address has failed to arrive, the next selection event provided is suppressed. When this continuously repeats for an inquiry location, then the interrogation frequency for this inquiry location is therefore reduced to half.

In order to accomplish this, it is provided, according to the invention, that in addition to each of the address storages at the memory location y1-yn, a note bit formed after failure of a respectively expected informaton to arrive after the selection of an inquiry location by way of the respective address of the inquiry location is storable in assignment to each of these address storages, namely, at memory locations x1-xn. When such a memory location is reached the next time in the course of the described, successive reading of the memory locations y1-yn, i.e. when a memory location at which the note bit is stored is reached, then the address stored at this memory location is not read. The note bit stored at the appertaining memory location, for example, the memory location x2, is thereby erased in turn and the selection of the appertaining inquiry location is suppressed once. Each time an address is read from a memory location, therefore, a check is carried out at the same time to see whether a note bit is already stored at the memory location, for example, the memory location x2, assigned to the memory location y2, for example. Given the presence of a note bit stored here, a selection of the appertaining inquiry location selectable by way of this address is suppressed and a note bit thereby already stored is erased. By contrast, when a respectively expected information after selection of an inquiry location fails to arrive, the note bit is again stored in assignment to the appertaining address, i.e. at the memory location corresponding to the appertaining memory location.

The operation set forth above are accomplished by the selection device E. Whenever it has again read an address of an inquiry location from one of the memory locations, for example, the location y2, it checks whether the note bit is stored at this memory location, for example the memory location x2. When this applies, the control device erases this as well as the previously-read address of the inquiry location and advances the cyclical read operation by one memory location, whereby the selection of an inquiry location prepared with the last address is suppressed once because no information was received in the appertaining, earlier selection of the same inquiry location in the preceding selection cycle.

The invention is not only of significance for the application wherein the inquiry locations A1-An are connection-associated switching devices but, in particular, is also of significance when these in relocations are message buffers of subcontrol units of connection or interface groups (cf. the descriptions in the aforementioned periodical "Telcom Report"). In such an application, the inquiry locations thus comprise, among other things, memories for an entire, respective plurality of information which are to be fetched in successive order. As a result of the present invention, the interrogation events can be concentrated on these message buffers on a case-by-case basis and, as needed, based on the measure of the respective traffic of information ready to be called in each of the message buffers and to be supplied to the processor P for processing.

As soon as and as long as no information are received from an inquiry location, the interrogation frequency for an inquiry location is thus reduced to about half. Accordingly, therefore, an inquiry location whose address occurs repeatedly, for example, three times in the interrogation cycle and which has not supplied any information for the first time in an interrogation event is not yet skipped during the next interrogation event because of this, but, rather it is skipped in a somewhat later interrogation event, for example, in the third interrogation event following thereupon. A certain inertia of the control which lies herein, however, only has a very slight effect since a significantly high crush of information cannot be present at an inquiry location at which a failure of a information expected for solicitation to arrive appears. The skipping of the inquiry location with respect to the interrogation events which controls the frequency of the interrogation events for the appertaining inquiry location, therefore, comes to bear, even though slightly later, early enough that a sudden increase in the number of information to be interrogated at the appertaining inquiry location (on which, therefore, the skipping could have a negative influence) cannot yet have occurred. On the contrary, the skipping which does not take effect until somewhat later has a relieving effect for the information interrogating devices and enables the interrogation frequency to be adapted to the respective quantity of information existing and to be interrogated per inquiry location.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A circuit arrangement for a telecommunications system, comprising:

a plurality of inquiry locations at which information may be present and may be solicited, each of said inquiry locations assigned an address;

a cyclically operating interrogation device for selective connection to and driving said inquiry locations to solicit information and to modify the frequency of interrogation of the individual inquiry locations depending on the appearance of solicited information to be called in; and memory means including an interrogation memory comprising a sequence of memory locations with corresponding note bit locations for storing a plurality of selection events within a overall control cycle by storing individual addresses of said inquiry locations a plurality of times at a corresponding number of memory locations regularly distributed within the sequence of memory locations, and for scanning each location a different number of times an interrogation memory selection means for cyclically reading the stored addresses to cyclically access said inquiry locations for soliciting information and upon failure to receive information from an accessed inquiry location to read the same address from the next memory location storing the same address and store a note bit in the corresponding bit location, and means for suppressing reading of an address in response to the appearance of a note bit for that address and then erasing the note bit.

* * * * *